US011442179B2

(12) United States Patent
Nozawa

(10) Patent No.: US 11,442,179 B2
(45) Date of Patent: *Sep. 13, 2022

(54) ELECTRONIC TIMEPIECE

(71) Applicant: Seiko Epson Corporation, Tokyo (JP)

(72) Inventor: Toshiyuki Nozawa, Okaya (JP)

(73) Assignee: Seiko Epson Corporation

( * ) Notice: Subject to any disclaimer, the term of this patent is extended or adjusted under 35 U.S.C. 154(b) by 246 days.

This patent is subject to a terminal disclaimer.

(21) Appl. No.: 16/784,472

(22) Filed: Feb. 7, 2020

(65) Prior Publication Data

US 2020/0174139 A1    Jun. 4, 2020

Related U.S. Application Data

(62) Division of application No. 15/460,670, filed on Mar. 16, 2017, now Pat. No. 10,649,097.

(30) Foreign Application Priority Data

Mar. 28, 2016 (JP) .................................. 2016-063676

(51) Int. Cl.
*G01S 19/45* (2010.01)
*G01S 19/48* (2010.01)
(Continued)

(52) U.S. Cl.
CPC .............. *G01S 19/45* (2013.01); *G01S 19/26* (2013.01); *G01S 19/48* (2013.01); *G01C 21/20* (2013.01);
(Continued)

(58) Field of Classification Search
CPC .......... G01S 19/14; G01S 19/26; G01S 19/34; G01S 19/45; G01S 19/48; G01S 19/08;
(Continued)

(56) References Cited

U.S. PATENT DOCUMENTS 5,790,477 A   8/1998  Hauke
5,905,460 A   5/1999  Odagiri et al.
(Continued)

FOREIGN PATENT DOCUMENTS

JP    2000-105286 A    4/2000
JP    2000-512014 A    9/2000
(Continued)

*Primary Examiner* — Chuong P Nguyen
(74) *Attorney, Agent, or Firm* — Harness, Dickey & Pierce, P.L.C.

(57) ABSTRACT

An electronic timepiece is provided that executes navigation to a destination site. The timepiece includes a display unit, a magnetic sensor, a reception unit that receives time information indicating a time from a GPS satellite, a storage unit that stores orbit information indicating an orbit of the GPS satellite, and a control unit that generates positional information indicating a position of the electronic timepiece using the time information received by the reception unit and the orbit information stored in the storage unit and executes the navigation using the display unit based on the positional information, an output of the magnetic sensor, and destination site information indicating a position of the destination site. When the orbit information is stored in the storage unit and then a first predetermined time equal to or less than a valid period of the orbit information elapses, the control unit updates the orbit information stored in the storage unit.

8 Claims, 10 Drawing Sheets

(51) Int. Cl.
*G01S 19/26* (2010.01)
*G01S 19/34* (2010.01)
*G01C 21/20* (2006.01)
*G01S 19/14* (2010.01)
*G04G 21/04* (2013.01)
*G04R 20/04* (2013.01)

(52) U.S. Cl.
CPC ............... *G01S 19/14* (2013.01); *G01S 19/34* (2013.01); *G04G 21/04* (2013.01); *G04R 20/04* (2013.01)

(58) Field of Classification Search
CPC ......... G01S 19/27; G01C 21/04; G01C 21/20; G04R 20/04
USPC ............ 342/357.28, 357.45, 357.66, 357.52, 342/357.65, 357.74, 357.31
See application file for complete search history.

(56) References Cited

U.S. PATENT DOCUMENTS

| | | | |
|---|---|---|---|
| 6,353,798 B1 | 3/2002 | Green et al. | |
| 6,373,431 B1 | 4/2002 | Nakajima | |
| 7,427,951 B2 | 9/2008 | Kuo et al. | |
| 7,701,390 B2 | 4/2010 | Fujisawa | |
| 8,028,014 B2* | 9/2011 | Mizuochi | G01S 19/42 708/445 |
| 8,125,854 B2 | 2/2012 | Fujisawa | |
| 8,432,771 B2 | 4/2013 | Matsuzaki | |
| 8,446,315 B2 | 5/2013 | Tomita | |
| 8,538,682 B1* | 9/2013 | Vankatraman | G01S 19/27 701/412 |
| 8,655,578 B2* | 2/2014 | Sambongi | G01C 21/28 340/995.25 |
| 8,674,877 B1 | 3/2014 | Mateski et al. | |
| 8,989,763 B2 | 3/2015 | Paulson et al. | |
| 9,229,435 B2* | 1/2016 | Matsuzaki | G01S 19/14 |
| 9,335,416 B2* | 5/2016 | Park | G01S 19/14 |
| 9,448,542 B2* | 9/2016 | Honda | G04R 20/04 |
| 9,864,066 B2 | 1/2018 | Park et al. | |
| 9,989,648 B2* | 6/2018 | Tomii | G01S 19/19 |
| 10,317,850 B2 | 6/2019 | Matsue | |
| 10,649,097 B2* | 5/2020 | Nozawa | G01S 19/48 |
| 2002/0141289 A1 | 10/2002 | Hayek et al. | |
| 2009/0278741 A1 | 11/2009 | Miyata | |
| 2010/0127929 A1* | 5/2010 | Uchida | G01S 19/072 342/357.66 |
| 2012/0316777 A1 | 12/2012 | Kitta | |
| 2014/0275850 A1 | 9/2014 | Venkatraman et al. | |
| 2014/0292564 A1 | 10/2014 | Park et al. | |
| 2015/0181527 A1* | 6/2015 | Yamamura | H04W 52/0251 455/456.1 |
| 2019/0094382 A1 | 3/2019 | Sekitsuka et al. | |
| 2019/0107814 A1* | 4/2019 | Matsue | G01S 19/256 |
| 2019/0294121 A1 | 9/2019 | Oshita et al. | |

FOREIGN PATENT DOCUMENTS

| | | |
|---|---|---|
| JP | 2000-338220 A | 12/2000 |
| JP | 2001-165695 A | 6/2001 |
| JP | 2008-286546 A | 11/2008 |
| JP | 2009-270929 A | 11/2009 |

\* cited by examiner

ELECTRONIC TIMEPIECE

This application is a divisional of U.S. patent application Ser. No. 15/460,670, filed Mar. 16, 2017, and is based on and claims priority from Japanese Patent Application No. 2016-063676, filed Mar. 28, 2016. The disclosures of the above-identified applications are hereby incorporated by reference herein in their entireties.

BACKGROUND

1. Technical Field

The present invention relates to an electronic timepiece.

2. Related Art

JP-T-2000-512014 discloses a timepiece that executes navigation to a destination site. The timepiece disclosed in JP-T-2000-512014 includes a GPS receiver that receives radio waves transmitted from GPS satellites (hereinafter referred to as "satellite signals"). The timepiece disclosed in JP-T-2000-512014 specifies a current site by executing positioning calculation using the satellite signals received by the GPS receiver. Then, the timepiece disclosed in JP-T-2000-512014 displays a distance from the current site to a destination site and a direction of the destination site and executes navigation to the destination site.

To execute positioning calculation using satellite signals, time information and orbit information included in the satellite signals are necessary. The satellite signals include information regarding schematic orbits of all the GPS satellites (hereinafter referred to as "almanac data") and include information regarding detailed orbits of GPS satellites which are transmission sources of the satellite signals (hereinafter "ephemeris data") as orbit information. The almanac data is updated once per day. The ephemeris data is updated once per two hours and a valid period is about 4 hours.

In general, an electronic device including a GPS receiver retains almanac data and ephemeris data when the electronic device receives the almanac data and the ephemeris data.

In a case in which both the almanac data and the ephemeris data retained in the electronic device including the GPS receiver are valid at the time of activating the GPS receiver, the electronic device including the GPS receiver starts positioning calculation after receiving time information without newly receiving the almanac data or the ephemeris data (hot start).

In a case in which only the almanac data is valid between the almanac data and the ephemeris data retained in the electronic device including the GPS receiver at the time of activating the GPS receiver, the electronic device including the GPS receiver newly receives ephemeris data, receives time information, and subsequently starts positioning calculation (warm start).

In a case in which both the almanac data and the ephemeris data retained in the electronic device including the GPS receiver are invalid at the time of activating the GPS receiver, the electronic device including the GPS receiver newly receives both of almanac data and ephemeris data, receives time information, and subsequently starts positioning calculation (cold start).

Therefore, in warm start and cold start, a time to first fix (TTFF) in which a GPS receiver is activated and a positioning calculation result is obtained is longer than in hot start.

Incidentally, in a timepiece that executes navigation using GPS, it is considered that a GPS receiver is not normally operated and the GPS receiver is sporadically operated according to a manipulation of instructing start of navigation in order to reduce power consumption.

In this case, however, when an interval of the manipulation of instructing start of navigation is long, there is a high possibility of a GPS receiver starting an operation at the cold start. Thus, it takes a long time to start the navigation. When the cold starts occurs many times, an operation time of the GPS receiver becomes longer. Consequently, power consumption increases.

SUMMARY

An advantage of some aspects of the invention is to provide a technology for suppressing a time taken to start navigation and suppressing power consumption related to an operation of a GPS receiver.

An electronic timepiece according to an aspect of the invention executes navigation to a destination site. The electronic timepiece includes: a display unit; a magnetic sensor; a reception unit that receives time information indicating a time from a GPS satellite; a storage unit that stores orbit information indicating an orbit of the GPS satellite; and a control unit that generates positional information indicating a position of the electronic timepiece using the time information received by the reception unit and the orbit information stored in the storage unit and executes the navigation using the display unit based on the positional information, an output of the magnetic sensor, and destination site information indicating a position of the destination site. When the orbit information is stored in the storage unit and then a first predetermined time equal to or less than a valid period of the orbit information elapses, the control unit receives orbit information from the GPS satellite using the reception unit and updates the orbit information stored in the storage unit to the orbit information received using the reception unit.

According to the aspect of the invention, when the orbit information is stored in the storage unit and then the first predetermined time elapses, orbit information is newly received, and the orbit information stored in the storage unit is updated to the newly received orbit information.

Therefore, even when the reception unit does not normally operate, the orbit information stored in the storage unit can be set as valid orbit information. Accordingly, it is possible to suppress invalidation of the orbit information at the time of starting the navigation while reducing power consumption more than in a case in which the reception unit normally operates, and thus it is possible to suppress a time taken to start the navigation.

An electronic timepiece according to an aspect of the invention executes navigation to a destination site. The electronic timepiece includes: a display unit; a magnetic sensor; a reception unit that receives time information indicating a time from a GPS satellite; a storage unit that stores orbit information indicating an orbit of the GPS satellite; and a control unit that generates positional information indicating a position of the electronic timepiece using the time information received by the reception unit and the orbit information stored in the storage unit and executes the navigation using the display unit based on the positional information, an output of the magnetic sensor, and destination site information indicating a position of the destination site. When the orbit information is stored in the storage unit and then a first predetermined time equal to or less than a valid period of the orbit information elapses, the control unit urges to update the orbit information stored in the storage unit.

According to the aspect of the invention, when the orbit information is stored in the storage unit and then the first predetermined time elapses, the orbit information stored in the storage unit is urged to be updated.

Therefore, even when the reception unit does not normally operate, the user can be allowed to update the orbit information stored in the storage unit. Accordingly, it is possible to suppress invalidation of the orbit information at the time of starting the navigation while reducing power consumption more than in a case in which the reception unit normally operates, and thus it is possible to suppress a time taken to start the navigation.

It is preferable that the electronic timepiece according to the aspect of the invention described above further includes a first manipulation unit that receives a first manipulation of giving an instruction to start the navigation, in which when the first manipulation unit receives the first manipulation, the control unit receives the time information from the GPS satellite using the reception unit, generates the positional information using the time information and the orbit information stored in the storage unit, and executes the navigation using the display unit based on the positional information, the output of the magnetic sensor, and the destination site information.

According to the aspect of the invention with this configuration, it is possible to suppress invalidation of the orbit information at the time of receiving the first manipulation, and thus it is possible to suppress a time taken to start the navigation according to the first manipulation.

In the electronic timepiece according to the aspect of the invention described above, it is preferable that, in a case in which an elapsed time until the orbit information is stored in the storage unit and then the first manipulation unit receives the first manipulation exceeds a second predetermined time shorter than the first predetermined time, the control unit receives the orbit information from the GPS satellite using the reception unit according to the first manipulation and updates the orbit information stored in the storage unit to the orbit information received according to the first manipulation.

According to the aspect of the invention with this configuration, orbit information can be newly received with the reception of the time information according to the first manipulation and the orbit information stored in the storage unit can be updated to the newly received orbit information. Since the elapsed time until the orbit information is stored in the storage unit and then the first manipulation is received exceeds the second predetermined time, the orbit information is updated. Therefore, for example, when the first manipulation is frequently executed in a situation in which the orbit information is valid, it is possible to suppress frequent updating of the orbit information more than necessary.

In the electronic timepiece according to the aspect of the invention described above, it is preferable that, in a case in which the elapsed time exceeds the second predetermined time, the control unit stops a reception operation of the reception unit when the orbit information is not receivable despite elapse of a third predetermined time after the reception unit starts the reception operation according to the first operation.

According to the aspect of the invention with this configuration, the reception operation of the reception unit is stopped in a case in which the orbit information may not be received. Therefore, the reception unit is prevented from unnecessarily operating.

In the electronic timepiece according to the aspect of the invention described above, it is preferable that the orbit information and the time information are included in a navigation message included in a satellite signal transmitted from the GPS satellite, and the third predetermined time is shorter than a transmission period of the navigation message.

According to the aspect of the invention with this configuration, since the reception unit is not operated for a time longer than the transmission period of the navigation message, the reception unit is prevented from unnecessarily operating.

In the electronic timepiece according to the aspect of the invention described above, it is preferable that, in a case in which the elapsed time does not exceed the second predetermined time, the control unit stops a reception operation of the reception unit when the time information is received according to the first manipulation.

According to the aspect of the invention with this configuration, the reception operation of the reception unit can be stopped with the reception of the time information, and thus it is possible to achieve power saving.

It is preferable that the electronic timepiece according to the aspect of the invention described above further includes a second manipulation unit that receives a second manipulation of giving an instruction to generate the destination site information, in which when the second manipulation unit receives the second manipulation, the control unit receives the time information and the orbit information from the GPS satellite using the reception unit, updates the orbit information stored in the storage unit to the orbit information received according to the second manipulation, and generates the positional information as the destination site information using the time information received according to the second manipulation and the updated orbit information stored in the storage unit.

According to the aspect of the invention with this configuration, it is possible to update the orbit information according to the second manipulation.

In the electronic timepiece according to the aspect of the invention described above, it is preferable that the orbit information is ephemeris data.

According to the aspect of the invention with this configuration, hot start can be executed when navigation starts.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
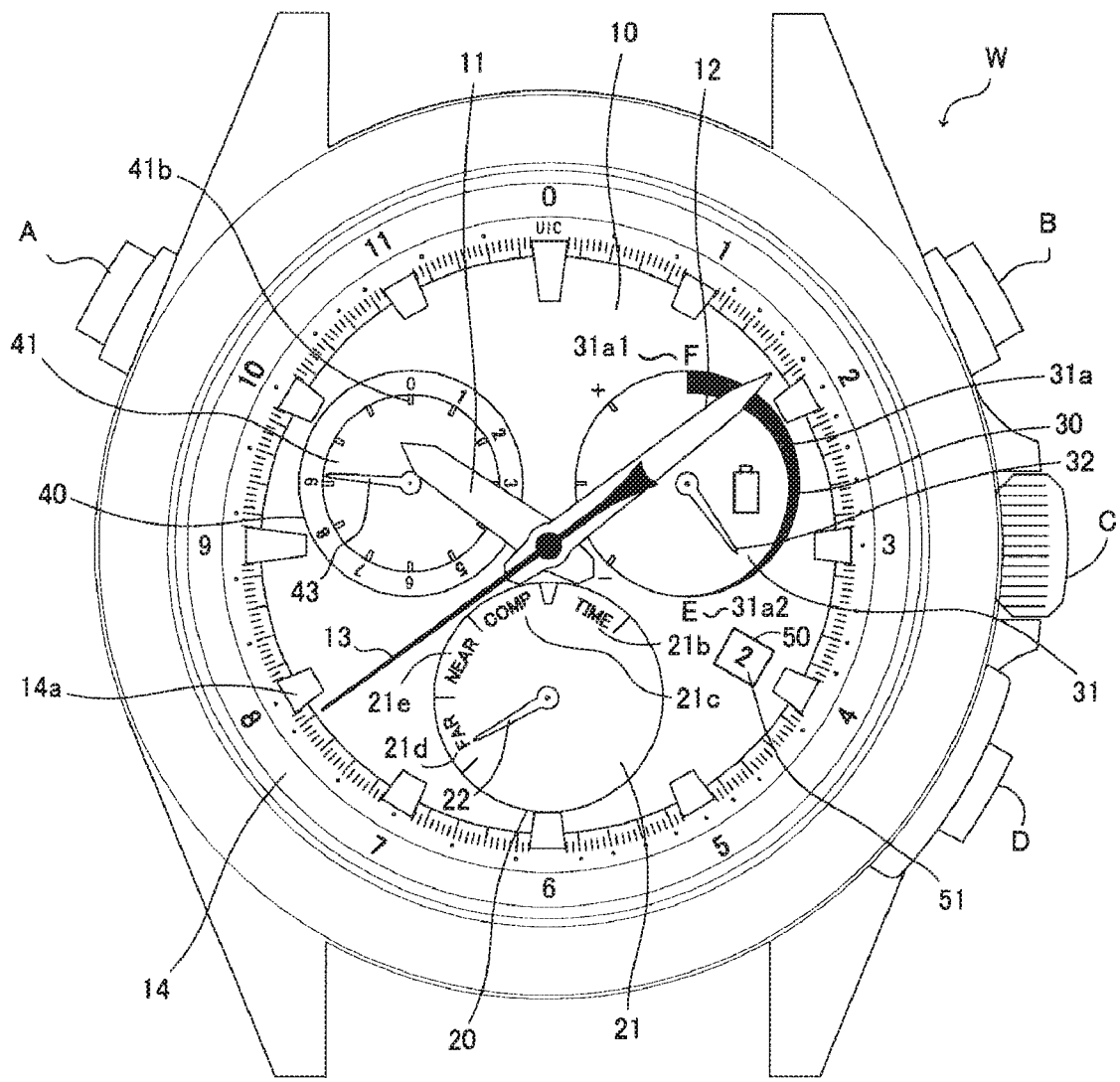
FIG. 1 is a plan view illustrating an electronic timepiece according to an embodiment.

Hereinafter, embodiments of the invention will be described with reference to the drawings. The dimensions and scales of the units in the drawing are appropriately different from actual dimensions and scales. Since the embodiments to be described below are specific examples suitable for the invention, various technically preferred limitations are imposed. The scope of the invention is not limited to such forms unless otherwise mentioned to particularly limit the invention in the following description.

FIG. 1 is a plan view illustrating an electronic timepiece W with a sensor (hereinafter simply referred to as an "electronic timepiece") according to the embodiment.

Overview of Electronic Timepiece W

First, an overview of the electronic timepiece will be described.

The electronic timepiece W has a navigation mode in which navigation to a destination site is executed and a time display mode in which a time is displayed as operation modes.

In the navigation mode, for example, the electronic timepiece W can execute navigation to return to a departure site. For the navigation, a site registration switch A and a navigation start switch B are used. The site registration switch A is an example of a second manipulation unit. The navigation start switch B is an example of a first manipulation unit.

Overview of Site Registration Operation

When a user continuously presses the site registration switch A at a departure site for a specific time (for example, 2 seconds) or more (presses the site registration switch A long), the electronic timepiece W acquires the coordinates (position coordinates) of the departure site and retains the coordinates. The coordinates of the departure site are used as coordinates of a destination site. The coordinates of the destination site are an example of destination site information indicating the position of the destination site. The electronic timepiece W acquires the coordinates of a departure site (current site) by GPS. Therefore, the coordinates of a position are indicated as longitude and latitude. The specified time is not limited to 2 seconds and can be appropriately modified. The manipulation of continuously pressing the site registration switch A for the specific time (pressing the site registration switch A long) is an example of a second manipulation of giving an instruction to generate the destination site information.

Overview of Navigation Operation

When the user moves to another site carrying the electronic timepiece W after site registration and thus the user continuously presses the navigation start switch B for a predetermined time (for example, 2 seconds) or more (presses the navigation start switch B long), the electronic timepiece W sets the operation mode to the navigation mode.

The predetermined time is not limited to 2 seconds, but can be appropriately changed. The manipulation of continuously pressing the navigation start switch B for the predetermined time or more (pressing the navigation start switch B long) is an example of a first manipulation of giving an instruction to start navigation.

The electronic timepiece W acquires the coordinates of the current site once or periodically by GPS and acquires the north direction periodically using a magnetic sensor to be described below in the navigation mode.

In the navigation mode, whenever the electronic timepiece W acquires the coordinates of the current site, the electronic timepiece W calculates a distance from the current site to the departure site (hereinafter referred to as a "distance up to the departure site") and an azimuth of the departure site (hereinafter referred to as an "azimuth of the departure site") viewed from the current site using the coordinates of the departure site and the coordinates of a recent current site.

When the electronic timepiece W calculates the azimuth of the departure site and the distance up to the departure site, the electronic timepiece W executes navigation for returning to the departure site by switching and pointing the direction of the destination site and the direction of the due north by a pointing hand 13 on the assumption that the north direction acquired using the magnetic sensor as a reference and by displaying a distance up to the destination site with a distance display hand 43. The indication direction of the pointing hand 13 is switched according to a pressing manipulation of the azimuth display changeover switch D. The pointing hand 13 and the distance display hand 43 are examples of a display unit.

Using GPS

Next, a method in which the electronic timepiece W obtains the coordinates of the current site (positional information) and time information using radio waves from GPS satellites will be described.

Figure 2:
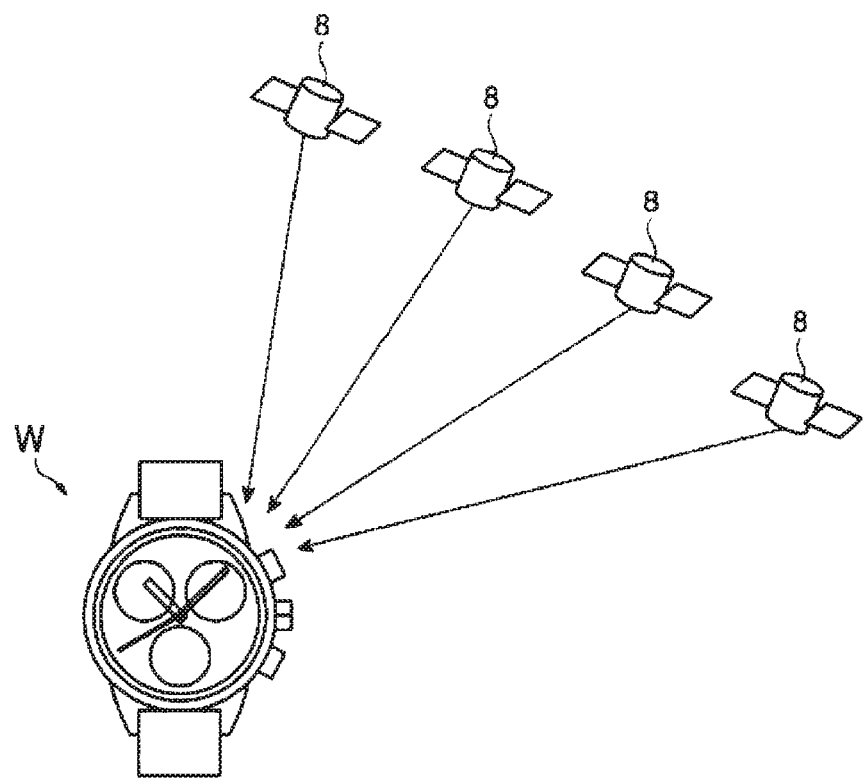
FIG. 2 is an overall diagram illustrating GPS including the electronic timepiece.

FIG. 2 is an overall diagram illustrating GPS including the electronic timepiece W.

The electronic timepiece W is a wristwatch that receives radio waves from GPS satellites 8 and corrects a measured time of an internal timepiece (an RTC 1 to be described below). The electronic timepiece W displays a time or the like on an opposite surface (hereinafter referred to as a "front surface") to a surface (hereinafter referred to as a "rear surface") on a side coming into contact with an arm. The GPS satellites 8 are navigation satellites that turn around a predetermined orbit above the Earth. The GPS satellites 8 transmit radio waves (LI waves) with 1.57542 GHz on which a navigation message is superimposed, to the ground. In the following description, radio waves with 1.57542 GHz on which a navigation message is superimposed are referred to as satellite signals. The satellite signals are circularly polarized waves of right handed polarized waves.

At present, there are about 31 GPS satellites 8 (in FIG. 2, only four satellites are illustrated). To identify which satellite signal is transmitted from which GPS satellite 8, each GPS satellite 8 superimposes a unique pattern with 1023 bits (a period of 1 ms) called a C/A code (coarse/acquisition code) on a satellite signal. Each bit is one of +1 and −1. Therefore, the C/A code is seen to be a random pattern.

An atomic clock is mounted on the GPS satellite 8. The satellite signal (navigation message) includes considerably accurate GPS time information measured by the atomic clock. The GPS time information is an example of time information indicating a time. A time error of the atomic clock mounted on each GPS satellite 8 is measured by a ground control segment. The satellite signal (navigation message) also includes a time correction parameter for correcting that time error. The electronic timepiece W receives a satellite signal (radio waves) transmitted from one GPS satellite 8 and matches a clocking time of the internal clock (the RTC 1) with an accurate time (time information) obtained using the time correction parameter and the GPS time information included in the satellite signal.

The satellite signal (navigation message) includes almanac data (information regarding schematic orbits of all the GPS satellites 8) and ephemeris data (information regarding detailed orbits of the GPS satellites 8 which are transmission sources of the satellite signals). The almanac data is updated once per day and the ephemeris data is updated once per two hours. A valid period of the ephemeris data is about 4 hours. The ephemeris data is an example of orbit information indicating an orbit of the GPS satellite 8.

The electronic timepiece W can execute positioning calculation to specify a position of the electronic timepiece W using GPS time information and the ephemeris data.

The positioning calculation is executed on the assumption that an error is included in a measured time of the internal timepiece of the electronic timepiece W to some extent. That is, a time error is also unknown in addition to x, y, and z parameters for specifying a 3-dimensional position of the electronic timepiece W. Therefore, the electronic timepiece W receives satellite signals transmitted generally from four or more GPS satellites 8, executes the positioning calculation using the satellite signals, and generates positional information of the current site (the coordinates of the current site).

The electronic timepiece W retains the almanac data and the ephemeris data received from the GPS satellites 8. In a case in which the almanac data and the ephemeris data retained in the electronic timepiece W are valid, the electronic timepiece W can receive the GPS time information, execute the positioning calculation, and generate positional information of the current site (the coordinates of the current site) without newly receiving the almanac data or the ephemeris data. That is, in a case in which the almanac data and the ephemeris data retained by the electronic timepiece W are valid, the electronic timepiece W can execute the hot start.

The electronic timepiece W updates the ephemeris data retained by the self-device (the electronic timepiece W) so that the hot start can be executed when navigation starts.

Referring back to FIG. 1, the description will be made.

The electronic timepiece W includes the time display unit 10, the site registration switch A, the navigation start switch B, a crown switch C, and an azimuth display changeover switch D.

The time display unit 10 includes an hour hand 11, a minute hand 12, the pointing hand 13, a dial ring 14, a 6 o'clock side information display unit 20 installed on the 6 o'clock side, a 2 o'clock side information display unit 30 installed on the 2 o'clock side, a 10 o'clock side information display unit 40 installed on the 10 o'clock side, and a date display unit 50.

In the dial ring 14, a 12-hour clock scale 14a is formed in a circular form.

The time display unit 10 displays a time with the hour hand 11 and the minute hand 12 using the scale 14a as a reference regardless of the operation mode. The pointing positions of the hour hand 11 and the minute hand 12 are changed, for example, according to a manipulation of the crown switch C.

The time display unit 10 displays a second of a time with the pointing hand 13 in the time display mode. The time display unit 10 switches and indicates the direction of the destination site and the direction of the due north with the pointing hand 13 in the navigation mode.

The 6 o'clock side information display unit 20 includes a letter plate 21 and a mode pointing hand 22.

On the letter plate 21, letters indicating the operation modes are written. Specifically, on the letter plates 21, a letter 21b of "TIME" indicating the time display mode, a letter 21c of "COMP", a letter 21d of "FAR", and a letter 21e of "NEAR" are written.

The 6 o'clock side information display unit 20 displays the time display mode as the operation mode by pointing the letter 21b of "TIME" by the mode pointing hand 22. The 6 o'clock side information display unit 20 displays the navigation mode as the operation mode by pointing any of the letter 21c of "COMP", the letter 21d of "FAR", and the letter 21e of "NEAR" by the mode pointing hand 22.

In other words, the 6 o'clock side information display unit 20 indicates the letter 21c of "COMP" on the letter plate 21 with the mode pointing hand 22 in a case in which the pointing hand 13 points the direction of the due north. The 6 o'clock side information display unit 20 indicates the letter 21d of "FAR" or the letter 21e of "NEAR" with the mode pointing hand 22 in a case in which the pointing hand 13 points the direction of the destination site.

In a case in which a distance up to the destination site is 1 km or more in a state in which the pointing hand 13 points the direction of the destination site, the mode pointing hand 22 points the letter 21d of "FAR" on the letter plate 21. In a case in which the mode pointing hand 22 points the letter 21d of "FAR", a scale 41b of numerical values written on a letter plate 41 of the 10 o'clock side information display unit 40 is used in units of 1 km and a distance range of a distance up to the destination site is 10 km. Since the mode pointing hand 22 points the letter 21d of "FAR" in the example illustrated in FIG. 1, a distance display hand 43 displays 9 km.

Conversely, in a case in which the distance up to the destination site is less than 1 km in the state in which the pointing hand 13 points the direction of the destination site, the mode pointing hand 22 points the letter 21e of "NEAR" on the letter plate 21. In a case in which the mode pointing hand 22 points the letter 21e of "NEAR", the scale 41b of numerical values of the 10 o'clock side information display unit 40 is used in units of 100 m and a distance range up to the distance of the destination site is 1000 m. For example, when the mode pointing hand 22 points the letter 21e of "NEAR" in the example illustrated in FIG. 1, it is indicated that the distance display hand 43 points 900 m.

The 2 o'clock side information display unit 30 includes a letter plate 31 and a residual quantity pointing hand 32.

A residual quantity meter 31a indicating a residual quantity of a battery used as a power supply of the electronic timepiece W is installed on the letter plate 31. In the residual quantity meter 31a, a letter 31a1 of "F" is installed at a position corresponding to a battery residual ratio of 100% and a letter 31a2 of "E" is installed at a position corresponding to the battery residual ratio of 0% (zero).

The 2 o'clock side information display unit 30 displays a residual quantity of the battery by pointing the residual quantity meter 31a by the residual quantity pointing hand 32.

The 10 o'clock side information display unit 40 includes a letter plate 41 and a distance display hand 43.

On the letter plate 41, a scale 41b of 0 to 9 is formed in a circular form.

In the case in which the operation mode is the navigation mode, the 10 o'clock side information display unit 40 displays a distance up to the destination site with a distance display hand 43 using the scale 41b as a reference.

The date display unit 50 includes a date wheel 51 displaying a date of a calendar.

Figure 3:
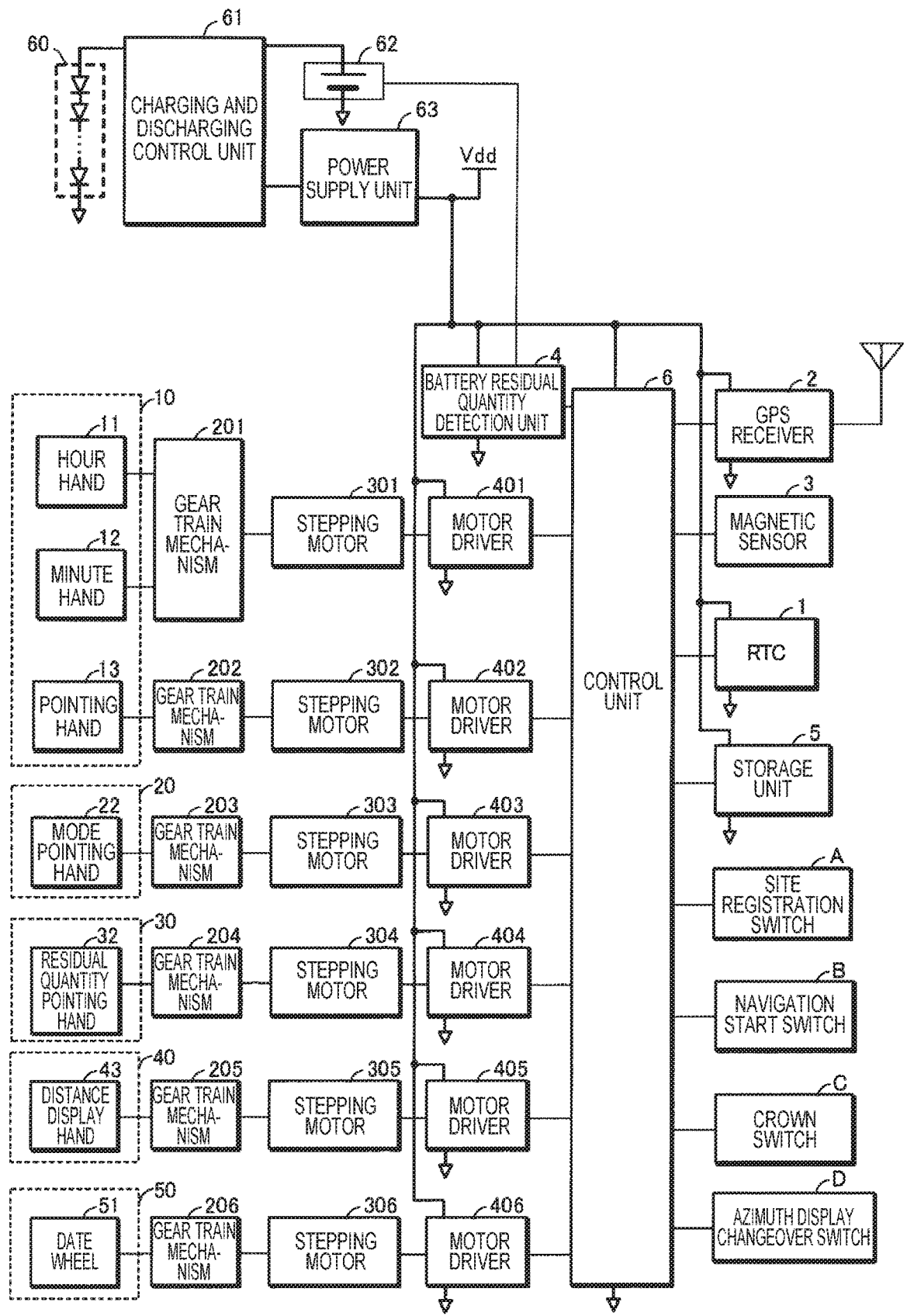
FIG. 3 is a diagram illustrating the configuration of the electronic timepiece.

FIG. 3 is a diagram illustrating the configuration of the electronic timepiece W. In FIG. 3, the same reference numerals are given to the same constituent elements as those illustrated in FIG. 1.

The electronic timepiece W includes a solar battery 60, a charging and discharging control unit 61, a secondary battery 62, and a power supply unit 63. The secondary battery 62 is used as a power supply of the electronic timepiece W. The charging and discharging control unit 61 charges the secondary battery 62 with power generated by the solar battery 60 and supplies the power of the secondary battery 62 to the power supply unit 63. The power supply unit 63 generates an internal power voltage Vdd using the power supplied from the secondary battery 62. The internal power voltage Vdd is supplied to the RTC 1, a GPS receiver 2, a battery residual quantity detection unit 4, a storage unit 5, a control unit 6, and motor drivers 401 to 406 to be described below.

As a configuration related to the time display unit 10, the electronic timepiece W includes the hour hand 11, the minute hand 12, the pointing hand 13, gear train mechanisms 201 and 202, stepping motors 301 and 302, and motor drivers 401 and 402. The motor driver 401 drives the stepping motor 301 to drive the hour hand 11 and the minute hand 12 via the gear train mechanism 201. The motor driver 402 drives the stepping motor 302 to drive the pointing hand 13 via the gear train mechanism 202.

As a configuration related to the 6 o'clock side information display unit 20, the electronic timepiece W includes the mode pointing hand 22, a gear train mechanism 203, a stepping motor 303, and a motor driver 403. The motor driver 403 drives the stepping motor 303 to drive the mode pointing hand 22 via the gear train mechanism 203.

As a configuration related to the 2 o'clock side information display unit 30, the electronic timepiece W includes the residual quantity pointing hand 32, the gear train mechanism 204, the stepping motor 304, and the motor driver 404. The motor driver 404 drives the stepping motor 304 to drive the residual quantity pointing hand 32 via the gear train mechanism 204.

As a configuration related to the 10 o'clock side information display unit 40, the electronic timepiece W includes the distance display hand 43, a gear train mechanism 205, a stepping motor 305, and a motor driver 405. The motor driver 405 drives the stepping motor 305 to drive the distance display hand 43 via the gear train mechanism 205.

As a configuration related to the date display unit 50, the electronic timepiece W includes the date wheel 51, a gear train mechanism 206, a stepping motor 306, and a motor driver 406. The motor driver 406 drives the stepping motor 306 to drive the date wheel 51 via the gear train mechanism 206.

The electronic timepiece W further includes the real time clock (RTC) 1, the GPS receiver 2, a magnetic sensor 3, the battery residual quantity detection unit 4, the storage unit 5, and the control unit 6.

The RTC 1 measures a time using a reference signal output from a crystal resonator (not illustrated).

The GPS receiver 2 receives satellite signals (radio waves) transmitted from the GPS satellites 8. The GPS receiver 2 is an example of a reception unit that receives time information and orbit information from the GPS satellites 8.

The magnetic sensor 3 detects geomagnetism, that is, the magnetic north.

The battery residual quantity detection unit 4 detects a residual ratio R of the secondary battery 62 which is a power supply. For example, the battery residual quantity detection unit 4 detects a voltage of the secondary battery 62 and detects the residual ratio R of the secondary battery 62 from the voltage. The battery residual quantity detection unit 4 periodically detects the residual ratio R of the secondary battery 62 while the electronic timepiece W is operating.

The storage unit 5 is, for example, a non-transitory storage medium. The storage unit 5 records the computer program. The storage unit 5 further stores almanac data and ephemeris data.

The control unit 6 is, for example, a CPU and realizes various functions by reading and executing a computer program stored in the storage unit 5.

For example, the control unit 6 generates the coordinates of a current position (hereinafter referred to as "coordinates of a current site") of the electronic timepiece W using the GPS time information received by the GPS receiver 2 and the ephemeris data stored in the storage unit 5.

The control unit 6 executes navigation to the departure site (destination site) using the pointing hand 13 and the distance display hand 43 based on the coordinates of the current site, the coordinates of the destination site, and an output of the magnetic sensor 3.

When the ephemeris data is stored in the storage unit 5 and then a first predetermined time (for example, 1 hour and 30 minutes) T1 equal to or less than a valid period of the ephemeris data elapses, the control unit 6 receives the ephemeris data from the GPS satellites 8 using the GPS receiver 2. Then, the control unit 6 updates the ephemeris data stored in the storage unit 5 to recent ephemeris data among the received ephemeris data. The first predetermined time T1 is not limited to 1 hour and 30 minutes and may be a time equal to or less than the valid period of the ephemeris data. The storage unit 5 stores first predetermined time information indicating the first predetermined time T1. The control unit 6 recognizes the first predetermined time T1 by reading the first predetermined time information from the storage unit 5.

Description of Operation

Next, an operation of the electronic timepiece will be described focusing on the navigation mode.

Site Registration Operation

Figure 4:
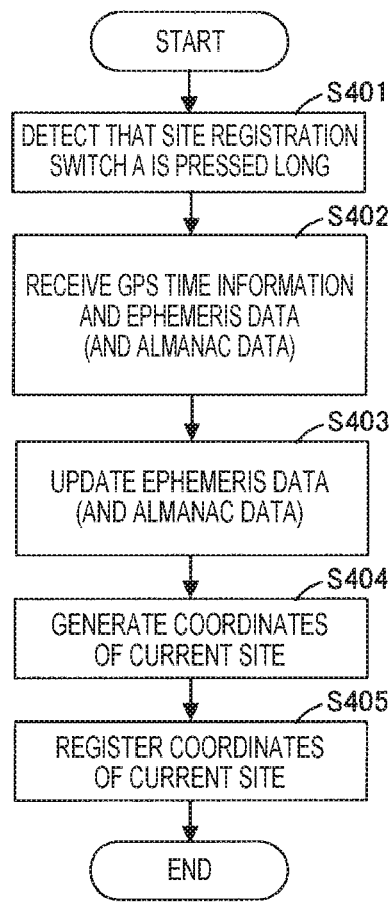
FIG. 4 is a flowchart illustrating a site registration operation.

FIG. 4 is a flowchart illustrating a site registration operation.

For example, when the control unit 6 detects that the site registration switch A is continuously pressed for a specific time (for example, 2 seconds) or more in the departure site (the site registration switch A is pressed long) (step S401), the control unit 6 activates the GPS receiver 2 and receives the GPS time information, the ephemeris data, and the almanac data via the GPS receiver 2 (step S402). When the control unit 6 receives the GPS time information, the ephemeris data, and the almanac data, the control unit 6 stops the reception operation of the GPS receiver 2. Since information equivalent to the almanac data of each GPS satellite can be generated from the ephemeris data, information equivalent to the almanac data may be generated from the ephemeris data without receiving the almanac data. Even in a case in which the almanac data is received, the almanac data corresponding to all the satellites may not necessarily be acquired.

Subsequently, the control unit 6 updates the almanac data and the ephemeris data stored in the storage unit 5 to the almanac data and the ephemeris data newly received in step S402 (step S403).

Therefore, according to the long pressing of the site registration switch A through the site registration, the almanac data and the ephemeris data stored in the storage unit 5 can be updated to the almanac data and the ephemeris data newly received in step S402.

Subsequently, the control unit 6 generates the coordinates of the current site using the GPS time information received in step S402 and the ephemeris data stored in the storage unit 5 (step S404).

Subsequently, the control unit 6 stores (registers) the coordinates of the current site generated in step S404 as destination site information in the storage unit 5 (step S405).

Measuring Storage Time of Ephemeris Data

Figure 5:
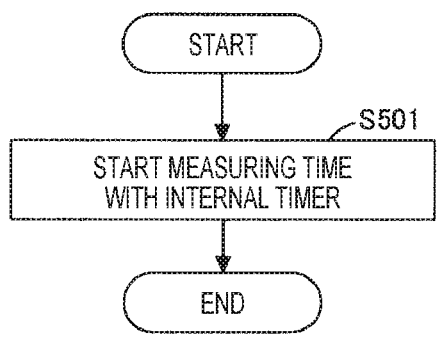
FIG. 5 is a flowchart illustrating a time measurement operation of an internal timer.

FIG. 5 is a flowchart illustrating a time measurement operation of a storage time of the ephemeris data.

When the ephemeris data is updated, the control unit 6 rests an internal timer (not illustrated) included in the control unit 6 and starts measuring a time in the internal timer (step S501).

The control unit 6 executes the operation illustrated in FIG. 5 whenever the ephemeris data is updated.

Automatic Updating of Ephemeris Data

Figure 6:
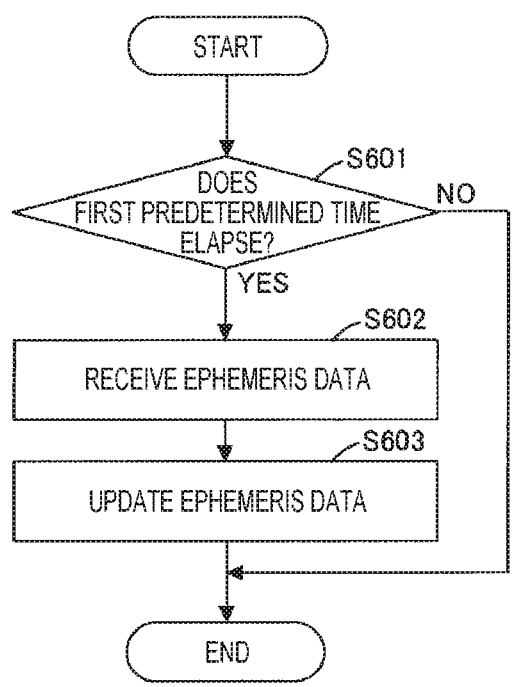
FIG. 6 is a flowchart illustrating an automatic updating operation for ephemeris data.

FIG. 6 is a flowchart illustrating an automatic updating operation for the ephemeris data.

In a case in which the internal timer executes measurement, the control unit 6 determines whether a measured time of the internal timer reaches the first predetermined time (for example, 1 hour and 30 minutes) T1, that is, the internal timer is reset to start the measurement and the first predetermined time T1 elapses (step S601).

When the measured time of the internal timer reaches the first predetermined time T1 (YES in step S601), the control unit 6 activates the GPS receiver 2 and receives the ephemeris data from the GPS satellites 8 using the GPS receiver 2 (step S602).

Subsequently, the control unit 6 updates the ephemeris data stored in the storage unit 5 to the recent ephemeris data among the ephemeris data received using the GPS receiver 2 (step S603).

Conversely, when the measured time of the internal timer does not reach the first predetermined time T1 (NO in step S601), the control unit 6 ends the operation illustrated in FIG. 6 without updating the ephemeris data stored in the storage unit 5.

Hereinafter, while the internal timer executes the measurement, the control unit 6 repeats the operation illustrated in FIG. 6.

According to the automatic updating operation for the ephemeris data, the ephemeris data stored in the storage unit 5 is updated to valid ephemeris data even when the GPS receiver 2 does not continuously operate. Accordingly, since the ephemeris data can be prevented from being invalid at the time of starting the navigation while saving power more than in a case in which the GPS receiver 2 normally operates, it is possible to suppress a time taken to start the navigation. When the ephemeris data is received via the GPS receiver 2, the control unit 6 stops the reception operation of the GPS receiver 2.

Navigation Operation

Figure 7:
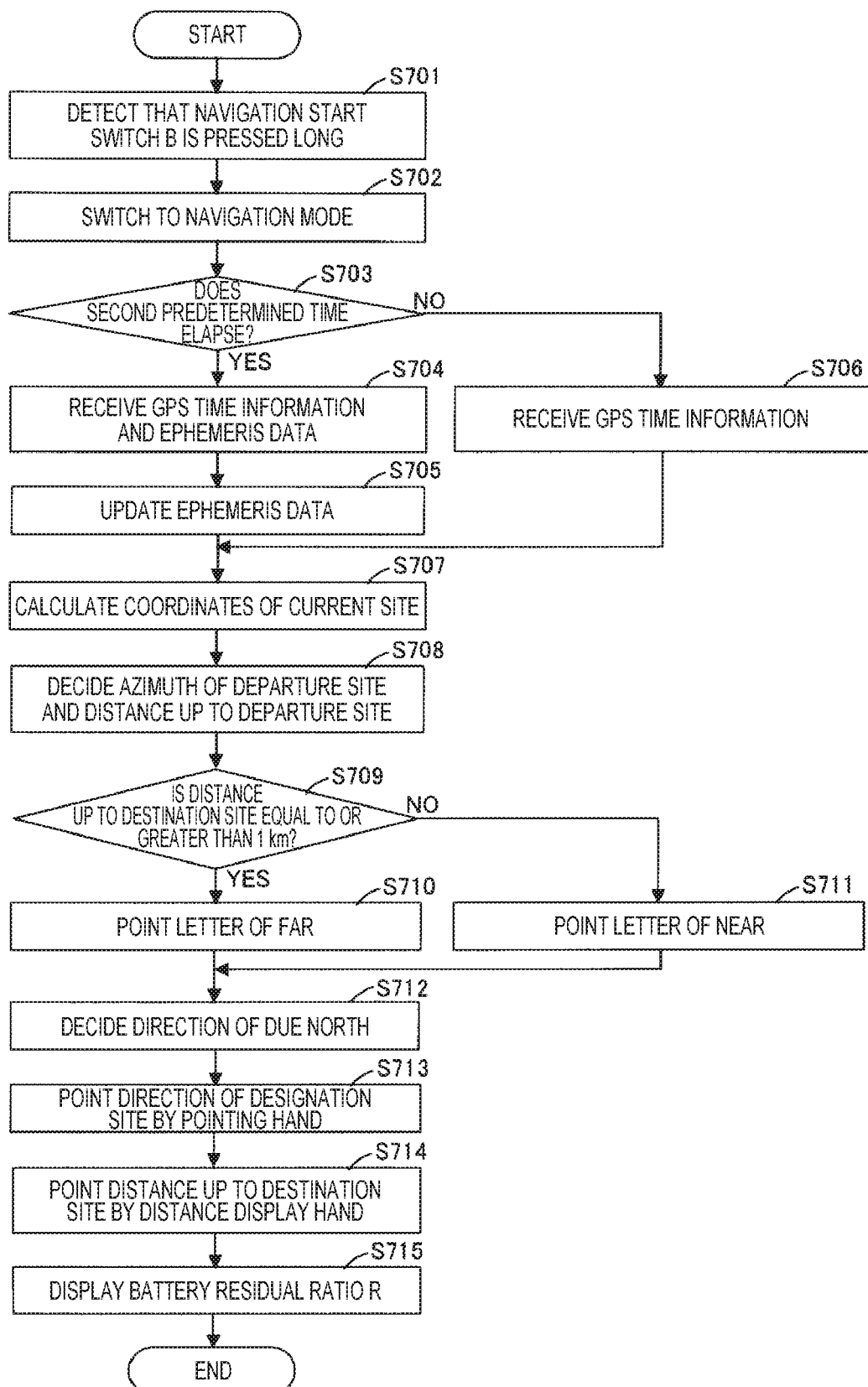
FIG. 7 is a flowchart illustrating a navigation operation.

FIG. 7 is a flowchart illustrating a navigation operation.

When the control unit 6 detects that the navigation start switch B is continuously pressed for the predetermined time (for example, 2 seconds) or more in the situation in which the operation mode is the time display mode (the navigation start switch B is pressed long in the time display mode) (step S701), the control unit 6 switches the operation mode from the time display mode to the navigation mode (step S702).

Subsequently, the control unit 6 determines whether a measured time of the internal timer exceeds the second predetermined time (for example, 1 hour) T2, that is, the internal timer is reset to start the measurement and then an elapsed time until the long pressing of the navigation start switch B exceeds the second predetermined time T2 (step S703).

In a case in which the measured time of the internal timer exceeds the second predetermined time T2 (YES in step S703), that is, the remaining valid period of the ephemeris data stored in the storage unit 5 is shortened, the control unit 6 activates the GPS receiver 2 and receives the GPS time information and the ephemeris data via the GPS receiver 2 (step S704). When the GPS time information and the ephemeris data are received, the control unit 6 stops the reception operation of the GPS receiver 2.

Subsequently, the control unit 6 updates the ephemeris data stored in the storage unit 5 to recent ephemeris data among the ephemeris data received using the GPS receiver 2 (step S705).

Conversely, in a case in which the measured time of the internal timer does not exceed the second predetermined time T2 (NO in step S703), the control unit 6 activates the GPS receiver 2 and receives the GPS time information via the GPS receiver 2 (step S706). In a case in which the control unit 6 receives the GPS time information, the control unit 6 stops the reception operation of the GPS receiver 2. In step S706, the ephemeris data is not received. Therefore, the reception operation of the GPS receiver 2 can be stopped with reception of the time information, and thus it is possible to achieve power saving.

When the control unit 6 receives the GPS time information in step S704 or S706, the control unit 6 generates the coordinates of the current site using the GPS time information and the ephemeris data stored in the storage unit 5 (step S707).

Subsequently, the control unit 6 decides an azimuth of the departure site viewed from the current site and a distance between the current site and the departure site (a distance up to the departure site) using the destination site information (the coordinates of the destination site) stored in the storage unit 5 and the coordinates of the recent current site (step S708).

Subsequently, the control unit 6 determines whether the distance up to the departure site is equal to or greater than 1 km (step S709).

In a case in which the distance up to the departure site is equal to or greater than 1 km (YES in step S709), the control unit 6 controls the motor driver 403 such that the mode pointing hand 22 points the letter 21d of "FAR" on the letter plate 21 in the 6 o'clock side information display unit 20 (step S710).

Conversely, in a case in the distance up to the departure site is less than 1 km (NO in step S709), the control unit 6 controls the motor driver 403 such that the mode pointing hand 22 points the letter 21e of "NEAR" on the letter plate 21 in the 6 o'clock side information display unit 20 (step S711).

Subsequently, the control unit 6 activates the magnetic sensor 3 and decides the direction of a magnetic north based on an output of the magnetic sensor 3. Subsequently, the control unit 6 corrects the direction of the magnetic north using information regarding a declination angle stored in advance in the storage unit 5 and decides the direction of the due north (step S712). In a case in which the storage unit 5 stores a declination angle table indicating a relation between the declination angle and the position coordinates, the control unit 6 may read the deflection angle corresponding to the coordinates of the current site from the declination angle table, correct the direction of the magnetic north using the read declination angle, and decide the direction of the due north.

Subsequently, the control unit 6 controls the motor driver 402 such that the pointing hand 13 points the direction of the destination site (step S713). Here, the control unit 6 decides the direction of the destination site based on the azimuth of the departure site and the direction of the due north.

Subsequently, the control unit 6 controls the motor driver 405 such that the distance display hand 43 displays the distance up to the destination site in the 10 o'clock side information display unit 40 (step S714).

In a case in which the mode pointing hand 22 points the letter 21d of "FAR" on the letter plate 21 in step S714, that is, the distance up to the destination site is equal to or greater than 1 km, the control unit 6 uses the scale 41b of numerical values of the 10 o'clock side information display unit 40 as units of 1 km. Therefore, a distance range of the distance up to the destination site is 10 km.

Conversely, in a case in which the mode pointing hand 22 points the letter 21e of "NEAR" on the letter plate 21, that is, the distance up to the destination site is less than 1 km, the control unit 6 uses the scale 41b of numerical values of the 10 o'clock side information display unit 40 as units of 100 m. Therefore, a distance range of the distance up to the destination site is 1000 m.

Subsequently, the control unit 6 acquires the residual ratio R of the secondary battery 62 from the battery residual quantity detection unit 4 and controls the motor driver 404 such that the residual quantity pointing hand 32 of the 2 o'clock side information display unit 30 points the battery residual ratio R (step S715).

When a manipulation of pressing the azimuth display changeover switch D is received at a time at which the pointing hand 13 points the direction of the destination site, the control unit 6 controls the motor driver 402 such that the direction pointed by the pointing hand 13 is switched to the direction of the due north. When the manipulation of pressing the azimuth display changeover switch D is received at a time at which the pointing hand 13 points the direction of the due north, the control unit 6 controls the motor driver 402 such that the direction pointed by the pointing hand 13 is switched to the direction of the destination site. Therefore, the pointing hand 13 alternately points the direction of the destination site and the direction of the due north according to the manipulation of pressing the azimuth display changeover switch D.

In a case in which the pointing hand 13 points the direction of the due north, the control unit 6 controls the motor driver 403 such that the mode pointing hand 22 points the letter 21c of "COMP" on the letter plate 21 in the 6 o'clock side information display unit 20.

Conversely, in a case in which the pointing hand 13 points the direction of the destination site, the control unit 6 controls the motor driver 403 such that the mode pointing hand 22 points the letter 21d of "FAR" on the letter plate 21 in the 6 o'clock side information display unit 20 when the distance up to the destination site is equal to or greater than 1 km. In a case in which the pointing hand 13 points the direction of the destination site, the control unit 6 controls the motor driver 403 such that the mode pointing hand 22 points the letter 21e of "NEAR" on the letter plate 21 in the 6 o'clock side information display unit 20 when the distance up to the destination site is less than 1 km.

Therefore, whether the pointing hand 13 points the direction of the destination site or points the direction of the due north can be determined with a letter pointed by the mode pointing hand 22 of the 6 o'clock side information display unit 20. Thus, two pieces of azimuth information (the direction of the destination site and the direction of the due north) can be displayed with one pointing hand 13.

Hereinafter, while the navigation mode continues, the control unit 6 periodically executes calculation of the coordinates of the current site using the satellite signals, an operation of deciding the direction of the due north using an output of the magnetic sensor 3, an operation of deciding the distance between the current site and the departure site using the destination site information and the coordinates of the current site, and an operation of deciding the direction of the destination site using the destination site information, the coordinates of the current site, and the direction of the due north, and then periodically updates display of the direction of the destination site, the direction of the due north, and the distance up to the destination site using these results.

To save power, the control unit 6 stops the operation of deciding the due north using the magnetic sensor 3, the direction pointing operation by the pointing hand 13, and the distance display operation by the distance display hand 43 and displays a time with the hour hand 11, the minute hand 12, and the pointing hand 13 in a case in which a time in which the navigation mode continues as the operation mode exceeds a predetermined threshold time (for example, 2 minutes). For example, the control unit 6 may forcibly change the operation mode from the navigation mode to the time display mode in a case in which the time in which the navigation mode continues as the operation mode exceeds the predetermined threshold time. The predetermined threshold time is not limited to 2 minutes and can be appropriately changed.

As another method of saving power, the calculation of the coordinates of the current site using the satellite signals may be executed only once through a manipulation executed once on the navigation start switch B, and only the operation of deciding the direction of the due north using the output of the magnetic sensor 3 may be executed periodically. In this case, the direction of the destination site and the direction of the due north are periodically updated without updating the distance up to the destination site. In a case in which the user stays at the same position and only the direction is changed, this operation suffices.

In this case, when the navigation start switch B is pressed in the navigation mode, the control unit 6 preferably executes an operation (including step S703) subsequent to step S703 illustrated in FIG. 7. At this time, in step S703, the control unit 6 determines whether the measured time of the internal timer exceeds the second predetermined time T2, that is, an elapsed time until the internal timer is reset to start the measurement and then a manipulation of pressing the navigation start switch B is executed, exceeds the second predetermined time T2.

Figure 8:
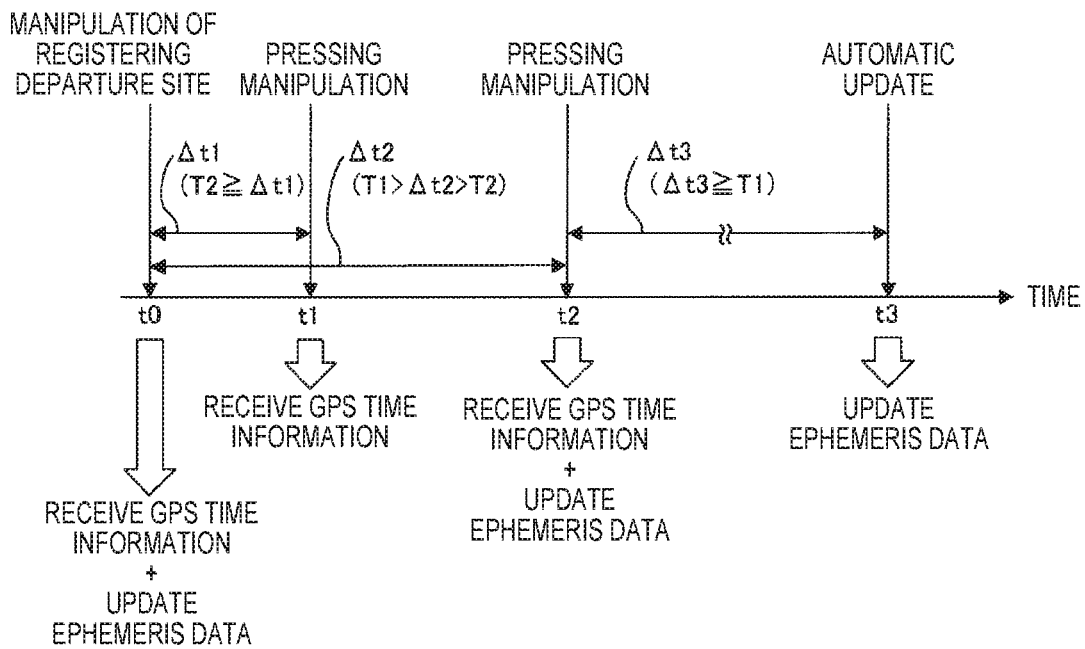
FIG. 8 is a diagram illustrating an example of updating the ephemeris data.

FIG. 8 is a diagram illustrating an example of a manipulation of pressing the navigation start switch B (referred simply to as a "pressing manipulation" in FIG. 8) and the automatic updating of the ephemeris data.

In a case in which a time Δt1 from time t0 at which the ephemeris data is updated to time t1 at which the manipulation of pressing the navigation start switch B is executed does not exceed the second predetermined time T2, the GPS time information is received according to a pressing manipulation at time t1, but the ephemeris data is not updated according to a pressing manipulation at time t1.

Conversely, in a case in which a time Δt2 from time t0 at which the ephemeris data is updated to time t2 at which the manipulation of pressing the navigation start switch B is executed exceeds the second predetermined time T2, the GPS time information is received according to a pressing manipulation at time t2, but the ephemeris data is updated according to a pressing manipulation at time t2.

When a time Δt3 at which the manipulation of pressing the navigation start switch B is not executed from time t2 at which the ephemeris data is updated is equal to or greater than the first predetermined time T1 (time t3), the GPS time information is not received and the ephemeris data is automatically updated.

According to the embodiment, the ephemeris data stored in the storage unit 5 is updated. Therefore, invalidation of the ephemeris data at the time of receiving the manipulation on the navigation start switch B can be suppressed, and it is possible to suppress a time taken to start navigation.

In a case in which an elapsed time until the ephemeris data is stored in the storage unit 5 and then the manipulation on the navigation start switch B is received exceeds the second predetermined time T2, the ephemeris data is updated. Therefore, for example, when a manipulation on the navigation start switch B is frequently executed in a situation in which the ephemeris data is valid, it is possible to suppress the frequent updating of the ephemeris data more than necessary. Thus, it is possible to shorten an operation time of the GPS receiver 2 and realize power saving.

Second Embodiment

When the ephemeris data is stored in the storage unit 5 and then the first predetermined time T1 elapses, the electronic timepiece W according to the first embodiment automatically updates the ephemeris data stored in the storage unit 5 so that the hot start can be executed at the time of starting navigation.

However, an electronic timepiece W1 according to a second embodiment of the invention urges to update the ephemeris data stored in the storage unit 5 when the ephemeris data is stored in the storage unit 5 and then the first predetermined time T1 elapses. That is, when the ephemeris data is stored in the storage unit 5 and then the first predetermined time T1 elapses, the electronic timepiece W1 according to the second embodiment allows a user to execute a manipulation of updating the ephemeris data.

The outer appearance of the electronic timepiece W1 according to the second embodiment is the same as that of the electronic timepiece W according to the first embodiment (see FIG. 1).

Figure 9:
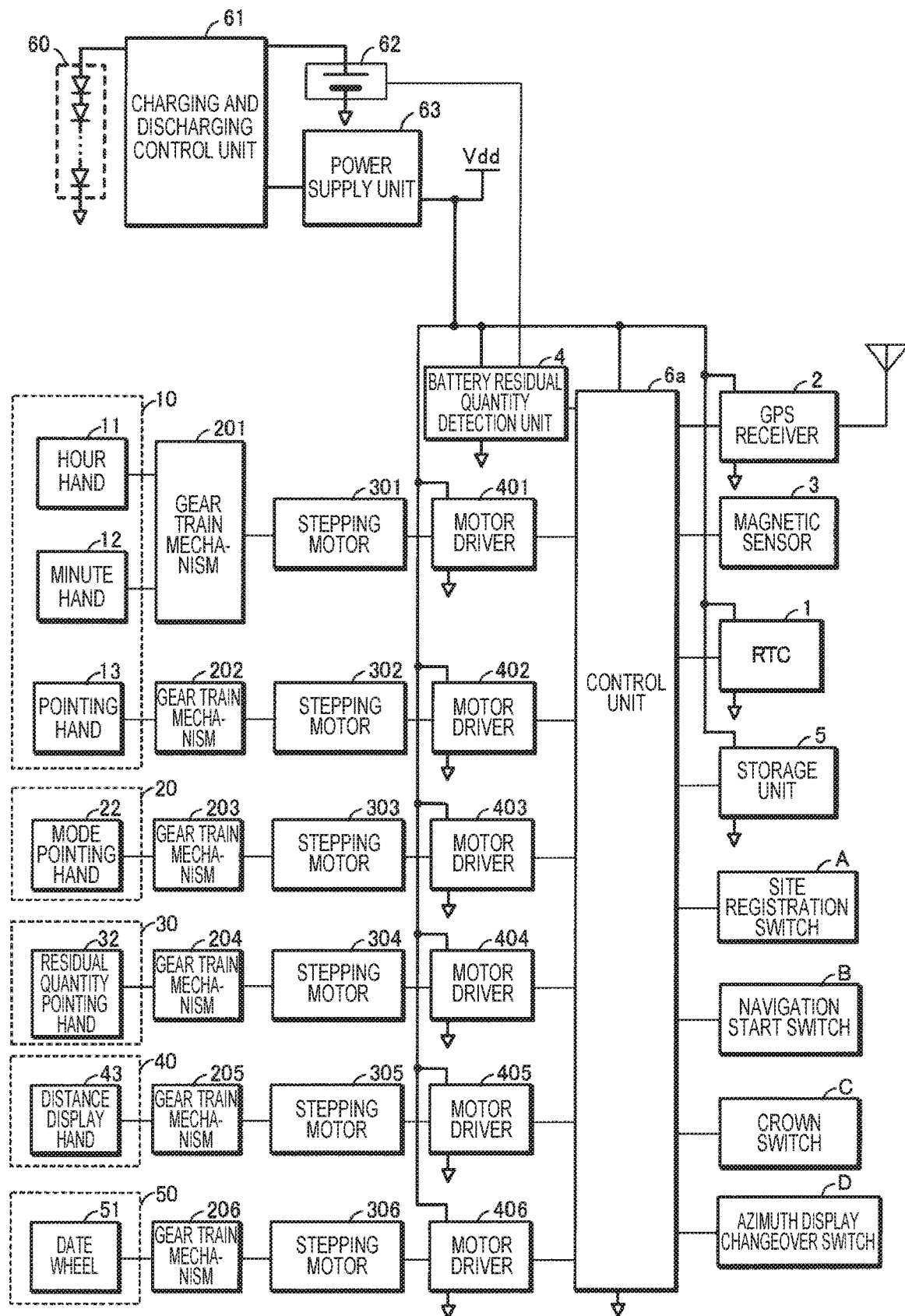
FIG. 9 is a diagram illustrating the configuration of an electronic timepiece.

FIG. 9 is a diagram illustrating the configuration of the electronic timepiece W1 according to the second embodiment. In FIG. 9, the same reference numerals are given to the same constituent elements as those illustrated in FIG. 3. The electronic timepiece W1 according to the second embodiment is different from the electronic timepiece W according to the first embodiment in that a control unit 6a is included instead of the control unit 6. Hereinafter, differences between the electronic timepiece W1 according to the second embodiment and the electronic timepiece W according to the first embodiment will be mainly described.

The control unit 6a is, for example, a CPU and realizes various functions by reading a computer program stored in the storage unit 5 and executing the computer program.

The control unit 6a operates in the same way as the control unit 6 except for an operation when the ephemeris data is stored in the storage unit 5 and then the first predetermined time T1 elapses.

When the ephemeris data is stored in the storage unit 5 and then the first predetermined time T1 elapses, the control unit 6a drives the pointing hand 13 counterclockwise and urges a user to update the ephemeris data stored in the storage unit 5.

A method of urging the user to update the ephemeris data stored in the storage unit 5 is not limited to the method of driving the pointing hand 13 counterclockwise and can be appropriately changed.

Operation of Urging to Update Ephemeris Data

Next, an operation of urging to update the ephemeris data will be described.

Figures 10, 11:
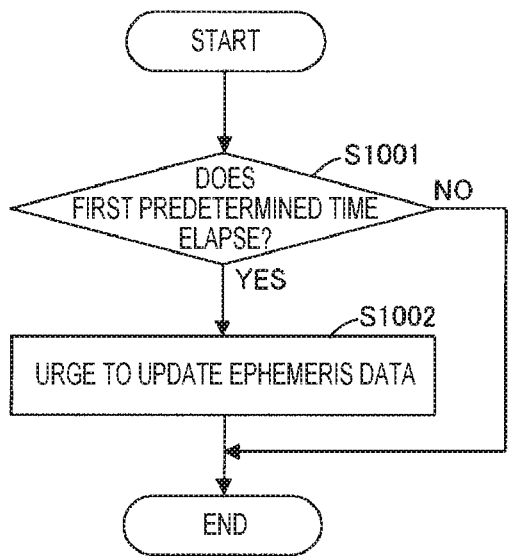
FIG. 10 is a flowchart illustrating an operation of urging updating ephemeris data.
FIG. 11 is a diagram illustrating an example of a destination site management table.

FIG. 10 is a flowchart illustrating an operation of urging a user to update the ephemeris data.

In a case in which an internal timer executes measurement, the control unit 6a determines whether a measured time of the internal timer reaches the first predetermined time T1, that is, the internal timer is rest to start executing the measurement and then the first predetermined time T1 elapses (step S1001).

When the measured time of the internal timer reaches the first predetermined time T1 (YES in step S1001), the control unit 6a drives the pointing hand 13 counterclockwise and urges the user to update the ephemeris data stored in the storage unit 5 (step S1002).

When the user perceives that the pointing hand 13 is driven counterclockwise, the user determines that it is necessary to update the ephemeris data and presses, for example, the navigation start switch B long.

When the navigation start switch B is pressed long, the control unit 6a executes the operation illustrated in FIG. 7. At this time, in step S705, the ephemeris data stored in the storage unit 5 is updated.

Conversely, when the measured time of the internal timer does not reach the first predetermined time T1 (NO in step S1001), the control unit 6a ends the operation illustrated in FIG. 10.

Hereinafter, while the internal timer executes the measurement, the control unit 6a repeats the operation illustrated in FIG. 10.

In the embodiment, when the ephemeris data is stored in the storage unit 5 and then the first predetermined time T1 elapses, the ephemeris data stored in the storage unit 5 is urged to be updated.

Therefore, even when the GPS receiver 2 does not normally operate, the user can be allowed to update the ephemeris data stored in the storage unit 5. Accordingly, it is possible to suppress invalidation of the ephemeris data at the time of starting the navigation while reducing power consumption more than in a case in which the GPS receiver 2 normally operates, and thus it is possible to suppress a time taken to start the navigation.

MODIFICATION EXAMPLES

The invention is not limited to the above-described embodiments. For example, various modification examples to be described below can be realized. Further, one modification example or a plurality of modification examples selected arbitrarily from the modification embodiments to be described below can also be appropriately combined.

Modification Example 1

In the above-described embodiments, the site registration switch A is pressed in the departure site for the specific time or more, the departure site is registered as the destination site, and subsequently the navigation for returning to the departure site is executed.

However, in a case in which the navigation for returning to the departure site is executed, the control unit 6 or the control unit 6a may register each of a plurality of sites (way point) on a movement path of the user in the storage unit 5, one of the plurality of registered sites may be used as a destination site, and navigation may be executed finally in the departure site while switching the site used as the destination site according to a user manipulation (Modification Example 1).

Hereinafter, an example in which Modification Example 1 is applied to the first embodiment will be described. In a case in which Modification Example 1 is applied to the second embodiment, the "control unit 6" may be replaced with the "control unit 6a" and the "electronic timepiece W" may be replaced with the "electronic timepiece W1" in the following description of Modification Example 1.

For example, in a state in which the coordinates of the destination sites previously registered in the storage unit 5 are all cleared, the user continuously presses the site registration switch A in each of the plurality of sites on the movement path for a specific time or more and sequentially registers the coordinates of each site (the coordinates of each destination site) in the electronic timepiece W. At this time, the control unit 6 gives a number corresponding to a procedure in which the site is registered to the coordinates of each site and stores the coordinates of the sites to which numbers are given in the storage unit 5.

For example, the control unit 6 gives a number "n" to the coordinates of an n-th registered site (where n is an integer equal to or greater than 1) and stores the coordinates of the site to which the number "n" is given in the storage unit 5.

FIG. 11 is a diagram illustrating an example of a destination site management table 5a used for the storage unit 5 to manage the coordinates of a site to which a number is given. In this case, a number is given in advance to the coordinates of each site (the coordinates of each destination site) registered before navigation starts.

For example, in a case both the site registration switch A and the navigation start switch B are pressed, the control unit 6 clears all the coordinates of the sites (the coordinates of the destination sites previously stored in the storage unit 5) to which numbers are given and which are registered in the destination site management table 5a.

The control unit 6 executes navigation to a destination site using one of the plurality of registered sites as the destination site, and further controls the motor driver 406 such that a number (n) given to the coordinates of the site used as the destination site is displayed in the date wheel 51.

For example, in a case in which the user sequentially registers the coordinates of n sites on one path in the electronic timepiece W (the storage unit 5), the control unit 6 first displays "n" in the date wheel 51 while executing the navigation in the site to which the number "n" is given using the coordinates of the site to which the number "n" is given and which is finally registered as the destination site (destination site information). The number given to the positional information used as the destination site information may be displayed in a pointing hand (for example, the residual quantity pointing hand 32) rather than the date wheel 51.

Thereafter, when the user determines that the site returns to the site to which the number "n" is given according to the navigation of the electronic timepiece W, the user manipulates the navigation start switch B and the crown switch C (for example, presses the navigation start switch B in the state in which the crown switch C is extracted) and switches the destination site from the coordinates of the site to which the number "n" is given to the coordinates of a site to which a number "n−1" is given. According to this switching, the electronic timepiece W starts navigation to the site to which the number "n−1" is given. Hereinafter, navigation for returning to the departure site is executed by switching the destination site so that the number displayed in the date wheel 51 decreases one by one.

Modification Example 2

In the above-described embodiments, the coordinates of the departure site (the destination site information) are registered in the storage unit 5 according to a manipulation on the site registration switch A. However, the destination site information may be registered in advance in the storage unit 5. For example, the coordinates of a Mecca position may be registered in advance as the coordinates of the destination site in the storage unit 5. In this case, a qibla (the direction of a worship of Muslim) can be displayed as the direction of a destination site.

Modification Example 3

Figure 12:
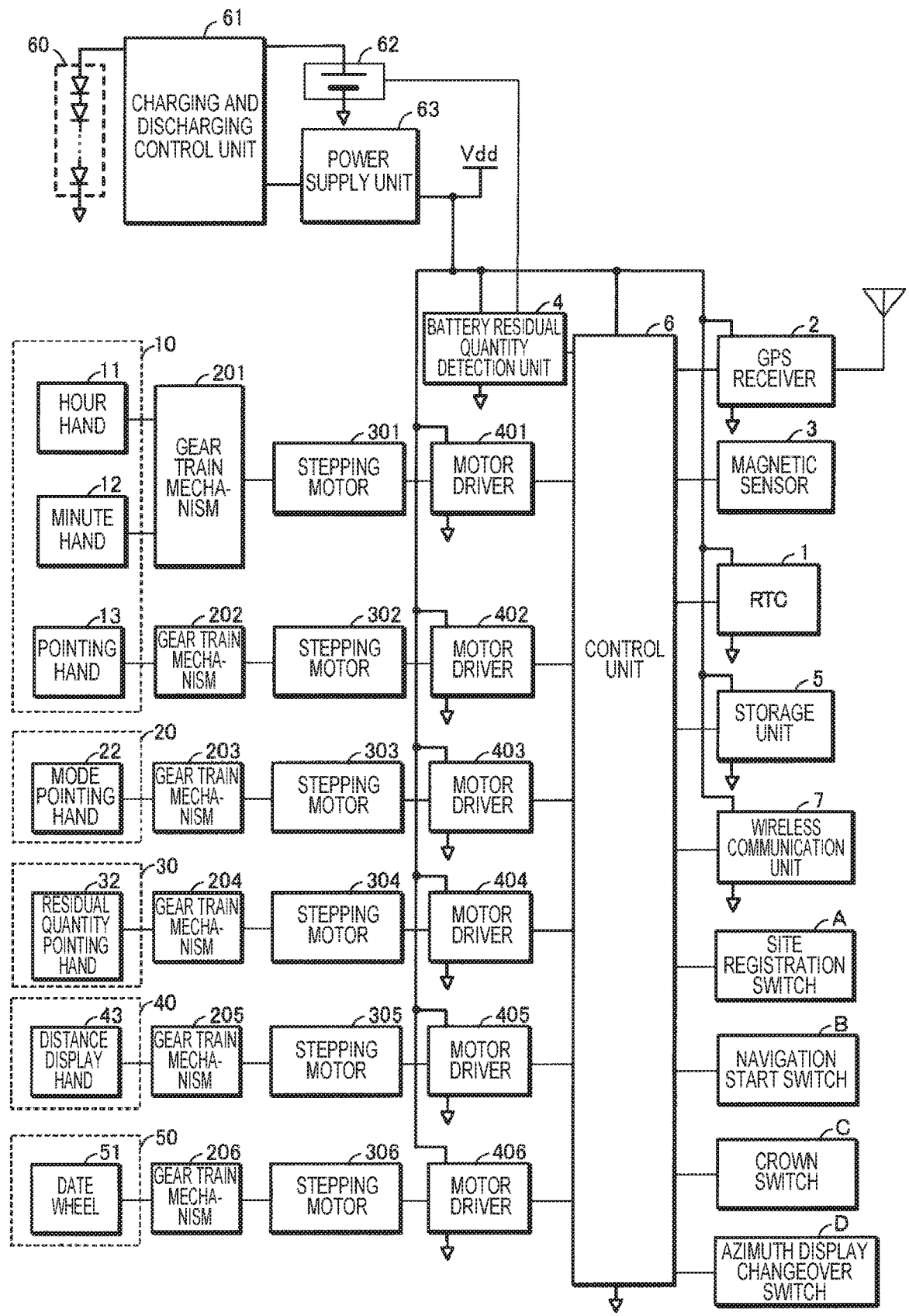
FIG. 12 is a diagram illustrating a configuration according to a modification example.

As illustrated in FIG. 12, the wireless communication unit 7 is installed in the electronic timepiece W. For example, the coordinates of a destination site may be registered via the wireless communication unit 7 from a communication device such as a smartphone. The wireless communication unit 7 may be installed in the electronic timepiece W1 and the coordinates of the destination site may be registered from a communication device such as a smartphone via, for example, the wireless communication unit 7.

Modification Example 4

Even when the GPS receiver 2 starts a reception operation according to a manipulation of starting navigation in step S704 illustrated in FIG. 7 and then a third predetermined time T3 elapses, the control unit 6 (or the control unit 6a) may stop the reception operation of the GPS receiver 2 in a case in which the ephemeris data is not receivable.

In this case, since the reception operation of the GPS receiver 2 is stopped in a case in which the ephemeris data is not receivable, the GPS receiver 2 is prevented from unnecessarily operating.

The ephemeris data and the GPS time information are included in a navigation message including satellite signals transmitted from the GPS satellites 8. Therefore, the third predetermined time T3 is preferably shorter than a transmission period of the navigation message. In this case, since the GPS receiver 2 does not operate for a time longer than the transmission period of the navigation message, the GPS receiver 2 is prevented from unnecessarily operating.

Modification Example 5

The distance up to the destination site has been pointed by one distance display hand 43 in the 10 o'clock side information display unit 40. However, the distance up to the destination site may be pointed using two pointing hands in the 10 o'clock side information display unit 40. In this case, for example, the distance display hand 43 may be used as one of the two pointing hands and the other of the two pointing hands may display a value of one digit equal to or less than a digit number of the value of the distance pointed by the distance display hand 43. The two pointing hands may be rotated about the same shaft or may be rotated about different shafts.

Modification Example 6

In the above-described embodiments, the pointing hand has been used as the display unit. The display unit may be a digital display unit such as a liquid crystal display (LCD) device.

Modification Example 7

In the above-described embodiments, the registration of the site and the start of the navigation are allocated to the different switches. However, the registration of the site and the start of the navigation may be allocated to the same switch. For example, the registration of the site and the start of the navigation may be allocated to the switch A, the registration of the site may be pressed long (for example, for a time equal to or more than 2 seconds), and the start of the navigation may be normally pressed and released (for example, for a time less than 2 seconds). In this way, it is possible to reduce the number of manipulation switches.

What is claimed is:

1. An electronic timepiece that executes navigation to a destination site, comprising:
   a display unit;
   a magnetic sensor;
   a reception unit configured to receive time information indicating a time from a GPS satellite;
   a storage unit that stores orbit information indicating an orbit of the GPS satellite; and
   a control unit configured to generate positional information indicating a position of the electronic timepiece using the time information received by the reception unit and the orbit information stored in the storage unit and execute the navigation using the display unit based on the positional information, an output of the magnetic sensor, and destination site information indicating a position of the destination site,
   wherein when the orbit information is stored in the storage unit and then a first predetermined time equal to or less than a valid period of the orbit information elapses, the control unit updates the orbit information stored in the storage unit.

2. The electronic timepiece according to claim 1, further comprising:
   a first manipulation unit configured to receive a first manipulation of giving an instruction to start the navigation,
   wherein when the first manipulation unit receives the first manipulation, the control unit is configured to receive the time information from the GPS satellite using the reception unit, generate the positional information using the time information and the orbit information stored in the storage unit, and execute the navigation using the display unit based on the positional information, the output of the magnetic sensor, and the destination site information.

3. The electronic timepiece according to claim 2, wherein in a case in which an elapsed time until the orbit information is stored in the storage unit and then the first manipulation unit receives the first manipulation exceeds a second predetermined time shorter than the first predetermined time, the control unit is configured to receive the orbit information from the GPS satellite using the reception unit according to the first manipulation and update the orbit information stored in the storage unit to the orbit information received according to the first manipulation.

4. The electronic timepiece according to claim 3, wherein in a case in which the elapsed time exceeds the second predetermined time, the control unit is configured to stop a reception operation of the reception unit when the orbit information is not receivable despite elapse of a third predetermined time after the reception unit starts the reception operation.

5. The electronic timepiece according to claim 4, wherein the orbit information and the time information are included in a navigation message included in a satellite signal transmitted from the GPS satellite, and
   wherein the third predetermined time is shorter than a transmission period of the navigation message.

6. The electronic timepiece according to claim 3, wherein in a case in which the elapsed time does not exceed the second predetermined time, the control unit is configured to stop a reception operation of the reception unit when the time information is received according to the first manipulation.

7. The electronic timepiece according to claim 1, further comprising:
   a second manipulation unit configured to receive a second manipulation of giving an instruction to generate the destination site information,
   wherein when the second manipulation unit receives the second manipulation, the control unit is configured to receive the time information and the orbit information from the GPS satellite using the reception unit, update the orbit information stored in the storage unit to the orbit information received according to the second manipulation, and generate the positional information as the destination site information using the time information received according to the second manipulation and the updated orbit information stored in the storage unit.

8. The electronic timepiece according to claim 1, wherein the orbit information is ephemeris data.

* * * * *